United States Patent Office.

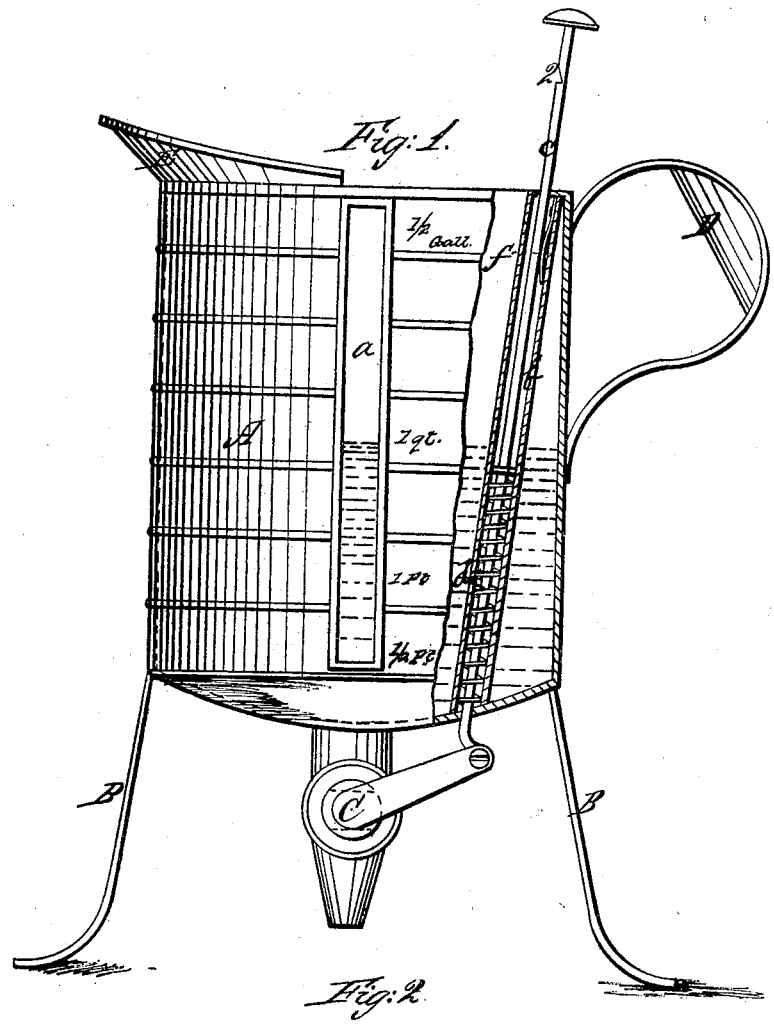
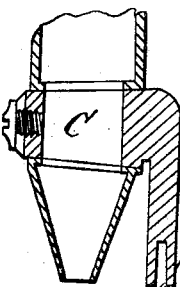

JOSEPH FANYON, OF PROVIDENCE, RHODE ISLAND.

Letters Patent No. 89,569, dated May 4, 1869.

IMPROVEMENT IN COMBINED MEASURE AND FUNNEL.

The Schedule referred to in these Letters Patent and making part of the same.

*To all whom it may concern:*

Be it known that I, Dr. JOSEPH FANYON, of Providence, in the county of Providence, and in the State of Rhode Island, have invented certain new and useful Improvements in Combined Funnel and Measure; and do hereby declare that the following is a full, clear, and exact description thereof, reference being had to the accompanying drawings, and to the letters of reference marked thereon.

The nature of my invention consists in the construction of a funnel and measure combined, for the purpose of measuring liquids, and turning them out from the top or letting them out from the bottom, which avoids the use of a separate funnel and measure.

In order to enable others skilled in the art to make and use my invention, I will now proceed to describe its construction and operation, referring to the annexed drawings, which form a part of this specification, and in which—

Figure 1 is a side view with section of the tube enclosing a rod for working the faucet.

Figure 2 is a section of the faucet.

A represents a vessel, of tin or other suitable material, resting on legs B B, and provided with a concave bottom, in the centre of which is an opening.

In this opening a faucet, C, made in any of the known and usual ways, is inserted.

The vessel A is provided with an oblong piece of glass, $a$, which is placed vertically in a groove or slot on its side, extending from top to bottom, and the outside of the vessel, near said glass, is graduated, so that any quantity may easily be measured therein.

On the inside of the vessel from near the handle D, a tube, $b$, extends down through a hole in the bottom. Said tube encloses a rod, $c$, which is connected at its lower end below the concave bottom of the vessel, with an arm of the faucet C, so that by pressing the rod $c$ down, the faucet opens, and when the pressure on the rod is removed, a spring, $d$, inside of said tube, and around the rod $c$, springs it up again and closes or shuts the faucet.

Near the top of the rod $c$ is a notch, $e$, which catches in the top of the tube $b$, when said rod is pressed down, by means of a spring, $f$, placed on the other side of the rod inside of the tube.

The rod is easily unhooked from this catch to close the faucet.

The upper edge of the vessel is also provided with a rim or spout, E, for pouring out the liquids.

Having thus fully described my invention,

What I claim as new, and desire to secure by Letters Patent, is—

The arrangement of the graduated funnel A, transparent plate $a$, faucet C, hollow tube $b$, notched rod $c$, and springs $d$ and $f$, all substantially as herein shown and described.

In testimony that I claim the foregoing, I have hereunto set my hand, this 18th day of June, 1868.

DR. JOSEPH FANYON.

Witnesses:
SIMON S. LAPHAM,
C. S. DICKERSON.